United States Patent
Nemer

(10) Patent No.: US 8,200,551 B1
(45) Date of Patent: *Jun. 12, 2012

(54) METHOD AND SYSTEM FOR PROVIDING RETAIL-ITEM-PURCHASING DATA IN A COMPUTER NETWORK ENVIRONMENT

(75) Inventor: James Russell Nemer, Spring Hill, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 38 days.

This patent is subject to a terminal disclaimer.

(21) Appl. No.: 12/755,174

(22) Filed: Apr. 6, 2010

Related U.S. Application Data

(62) Division of application No. 10/231,640, filed on Aug. 30, 2002, now Pat. No. 7,720,715.

(51) Int. Cl.
*G06Q 30/00* (2012.01)
(52) U.S. Cl. .................. 705/26.9; 705/26.1; 705/27.1
(58) Field of Classification Search ......... 705/26.1–27.2
See application file for complete search history.

(56) References Cited

U.S. PATENT DOCUMENTS

| | | | |
|---|---|---|---|
| 6,154,745 | A | 11/2000 | Kari et al. |
| 6,317,718 | B1 | 11/2001 | Fano |
| 6,954,735 | B1 | 10/2005 | Djupsjobacka et al. |
| 7,720,715 | B1 * | 5/2010 | Nemer .................. 705/26.1 |
| 2004/0107142 | A1 | 6/2004 | Tomita et al. |

OTHER PUBLICATIONS

"StoreRunner Launches Alacer—Breakthrough Product Search Technology" Business & Technology Editors. Business Wire. New York: Oct. 26, 2000. p. 1. Previously provided in parent U.S. Appl. No. 10/231,640.*

"StoreRunner Launches Alacer—Breakthrough Product Search Technology", Business & Technology Editors, Business Wire, New York: Oct. 26, 2000, p. 1., Retrieved via ProQuest on Dec. 11, 2009.

* cited by examiner

*Primary Examiner* — Michael Misiaszek

(57) ABSTRACT

A method and system for communicating retail-item-purchasing data in a computer network environment is provided. Commute information is leveraged to provide purchasing options to end-users and to permit customers to automatically search for various products available at local businesses without having to visit each business. The commute information can be a commute path or a location reference. One or more providers of the items within a distance of the commute path are identified. Purchasing data is communicated based on the determination of the providers.

20 Claims, 2 Drawing Sheets

METHOD AND SYSTEM FOR PROVIDING RETAIL-ITEM-PURCHASING DATA IN A COMPUTER NETWORK ENVIRONMENT

PRIORITY

This application is a divisional of application Ser. No. 10/231,640, filed 30 Aug. 2002, which is incorporated herein by reference.

STATEMENT REGARDING FEDERALLY SPONSORED RESEARCH OR DEVELOPMENT

Not applicable.

TECHNICAL FIELD

In general, embodiments of the invention are related to the field of wide area computer networking. More particularly, embodiments of the invention relate to a method and system for communicating purchasing information of products available from businesses along a commute path or within a distance from some location.

BACKGROUND

People typically have one or more recurring commutes. Examples of recurring commutes include traveling from home to work, from home to school, or from school to work. Shopping can be difficult as time demands are spread across other activities. Synergizing commuting with shopping would enhance both experiences and could reduce wasted time. Currently, however, available options for shopping or soliciting purchasing information include a "bricks and mortar" environment and a "virtual shopping" environment.

In the "bricks and mortar" environment, customers visit local businesses to find products of interest. This often involves having to physically visit a business to determine pricing and availability of desired goods. Shopping in a virtual environment, such as the Internet, involves browsing for products on-line to be delivered later. Shopping on-line requires a waiting period for products to be delivered and a level of faith that the transaction will be completed securely. In both of these environments, the burden of seeking the lowest price and adequate availability of desired goods is placed on the consumer. It is the consumer that must peruse through the barrage of local advertisements to find the best prices at various locations. Moreover, neither environment allows commute information to be used in making purchasing options.

The Internet can be browsed by a variety of client devices such as personal computers, handheld devices, mobile phones and the like. No shopping paradigm leverages the various technologies available via the Internet, businesses, and client devices with commute information to marry the benefits offered by both the "bricks and mortar" environment and the "virtual shopping" environment. The current state of the art could be improved by providing a system and method for providing purchasing information related to a commute or to a location. There is a need for a method and system whereby customers can submit requests for purchases and have pricing information of disparate products returned from one or more providers.

SUMMARY

Embodiments of the invention are defined by the claims below, not this summary. A high-level overview of various aspects of embodiments of the invention are provided here for that reason, to provide an overview of the disclosure, and to introduce a selection of concepts that are further described in the detailed-description section below. This summary is not intended to identify key features or essential features of the claimed subject matter, nor is it intended to be used as an aid in isolation to determine the scope of the claimed subject matter.

Embodiments of the invention provide a system and method for communicating retail-item-purchasing data in a computer network environment. Embodiments of the invention have several practical applications in the technical arts, including leveraging commute information to provide purchasing options to end-users and permitting customers to automatically search for various products available at local businesses without having to visit all of the different businesses.

In one embodiment of the invention, a method is disclosed for providing purchasing options of items available for sale at physical stores. An electronic representation of a list of one or more items to query is received. Next, a commute path defined by two locations is referenced. This commute path can be dictated or created. A determination is made of one or more providers of the items within a distance of the commute path. Alternatively, a single location can be submitted. Finally, purchasing data is communicated based on the determination of the providers.

In another embodiment the invention, various data submitted can be stored for later recall. Exemplary data that can be stored include the list of items to query, prior commute paths, and purchase requests. Promotional offers can be presented to end-users on client devices.

In another embodiment of the invention, a method employing a user interface for providing purchasing data is disclosed. A first prompt is presented on a client device for communicating a request for information regarding a list of items. A second prompt is presented for communicating a commute route. Finally, purchasing data related to one or more of the items is presented to the end-user. Exemplary purchasing data includes item pricing and availability.

BRIEF DESCRIPTION OF THE SEVERAL VIEWS OF THE DRAWINGS

Embodiments of the present invention are described in detail below with reference to the attached drawing figures, wherein.

DETAILED DESCRIPTION

Figure 1:
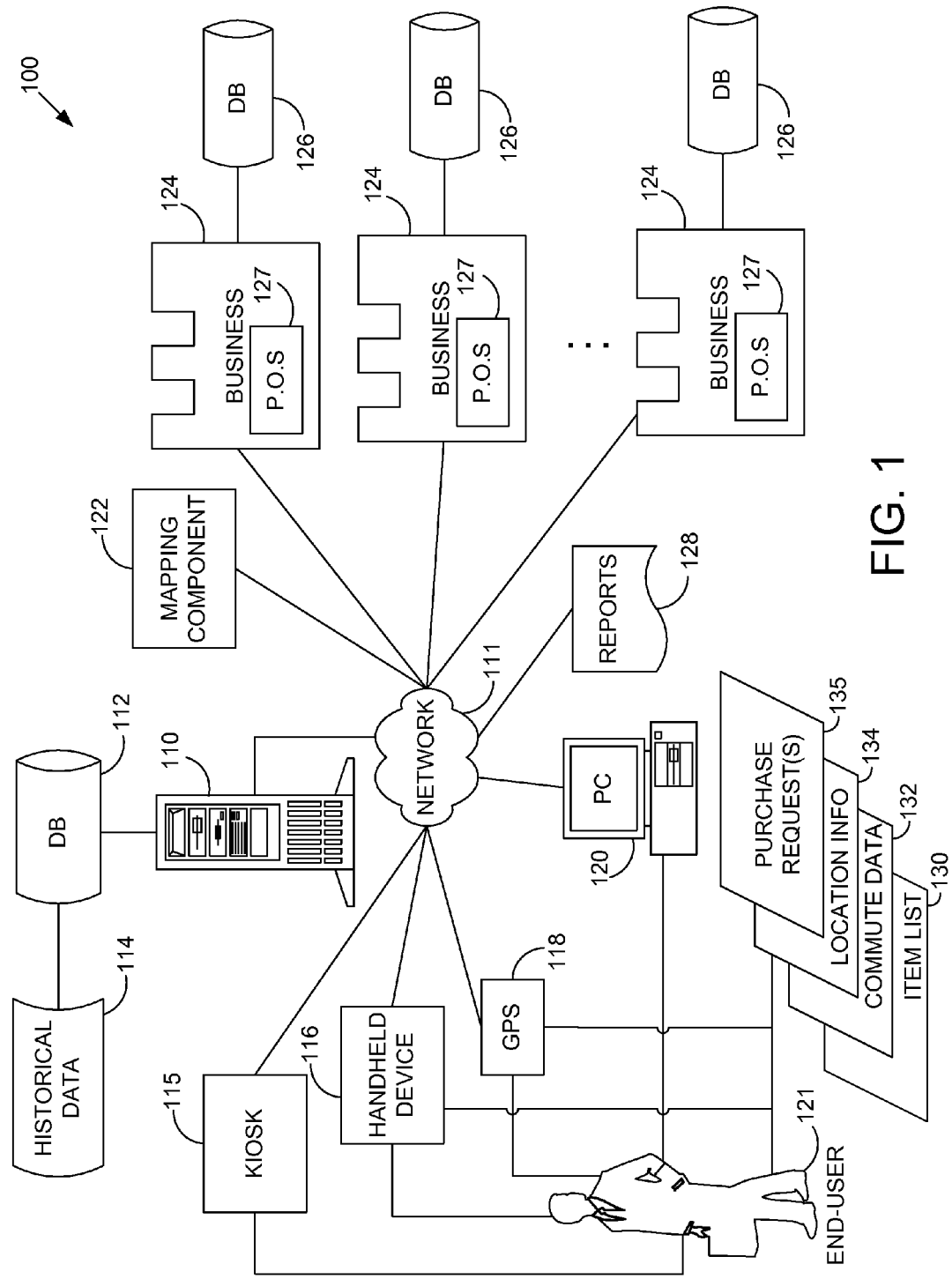
FIG. 1 is a block diagram of an exemplary operating environment for practicing an embodiment of the invention.

Embodiments of the present invention provide a method and system for communicating retail-item-purchasing data. The system can be referred to as a retail product brokering system ("RPBS"). Turning now to FIG. 1, a block diagram of an exemplary computing environment for implementing the RPBS is referenced generally by the numeral 100. The computing environment 100 is only one example of a suitable computing environment and is not intended to suggest any limitation as to the scope of use or functionality of embodiments of the invention. Neither should the computing environment 100 be interpreted as having any dependency or requirement relating to any one or combination of components illustrated in the exemplary environment 100.

Embodiments of the invention are operational with numerous other general purpose or special purpose computing systems, environments, or configurations. Examples of well-known computing systems, environments, and/or configurations that may be suitable for use with embodiments of the invention include, but are not limited to, personal computers, server computers, hand-held devices, telephony devices, laptop devices, multiprocessor systems, microprocessor-based systems, set top boxes, programmable consumer electronics, automobile two-way communication devices, network PCs, minicomputers, mainframe computers, and distributed computing environments that include any of the above systems or devices and the like.

An embodiment of the invention may be described in the general context of computer-executable instructions, such as program modules, being executed by a computer or other machine. Generally, program modules include routines, programs, objects, components, data structures, etc., which perform particular tasks or implement particular abstract data types. Embodiments of the invention may also be practiced in distributed computing environments where tasks are performed by remote processing devices that are linked through a communications network. In a distributed computing environment, program modules may be located in both local and remote computer-storage media, including memory storage devices.

With reference to FIG. 1, an exemplary RPBS includes a general purpose computing device in the form of server 110. Components of server 110 may include, but are not limited to, a processing unit, internal system memory, and a suitable system bus for coupling various system components, including database 112 to the control server 110. These individual components or subcomponents are not shown because of their conventional nature. The system bus may be any of several types of bus structures, including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronic Standards Association (VESA) local bus, and Peripheral Component Interconnect (PCI) bus, also known as Mezzanine bus.

Server 110 typically includes therein or has access to a variety of computer-readable media, for instance, database 112. Computer-readable media can be any available media that can be accessed by server 110, and includes both volatile and nonvolatile media, removable and nonremovable media. By way of example, and not limitation, computer-readable media may comprise computer-storage media.

Computer-storage media includes both volatile and nonvolatile, removable and nonremovable media implemented in any method or technology for storage of information, such as computer-useable instructions, data structures, program modules or other data. Computer-storage media includes, but is not limited to, RAM, ROM, EEPROM, flash memory or other memory technology, CD-ROM, digital versatile disks (DVD), holographic media or other optical disk storage, magnetic cassettes, magnetic tape, magnetic disk storage, or other magnetic storage devices, or any other medium which can be used to store the desired information and which can be accessed by server 110.

The computer-storage media, including database 112, discussed above and illustrated in FIG. 1, provide a storage of computer-readable instructions, data structures, program modules, historical data 114, and other data for server 110. Server 110 is also equipped with its own internal storage means including a conventional hard-drive or optical-drive.

Server 110 may operate in a computer network 111 using logical connections to one or more client devices. Client devices could include a kiosk 115, a handheld device 116, a global positioning component (GPS) 118, and/or a client computer 120, which can be a personal computer, server, router, a network PC, a peer device or other common network node, and may include some or all of the elements described above relative to server 110. Handheld 116 is not limited to a mobile phone, a pager, a personal data assistant (PDA), or a personal information manager (PIM).

Server 110 is also coupled to a mapping component 122, as well as to many different businesses 124, each with a business-database 126 and a point-of-sale device 127. Point-of-sale device 127 can be any device used to process a retail transaction. Server computer 110 can produce reports 128 based on receiving various data, including but not limited to a list of items to query 130, commute data 132, location information 134, and purchase request(s) 135.

Computer network 111 may be a local area network (LAN) and/or a wide area network (WAN), or a network of networks. Such networking environments are commonplace in offices, enterprisewide computer networks, intranets, and the Internet. When utilized in a WAN networking environment, server 110 may include a modem, network interface card, or other means for establishing communications over the network, including means for accessing the Internet.

In a networked environment, program modules or portions thereof may be stored in server 110, or database 112. For example, various application programs may reside on the memory associated with any one or all of the client devices. It will be appreciated that the network connections shown are exemplary and other means of establishing a communications link between the computers may be used.

By way of example, a user may enter commands and information into server 110 or convey the commands and information to the server 110 via handheld device 116, GPS component 118, kiosk 115, or client computer 120 (collectively "input devices") through data entry components, such as keyboards, pointing devices, commonly referred to as a mouse, trackball, or touch pad (or touch screen), or voice input means. Other input devices may include accepting data from an interface or logic system, microphone, satellite dish, scanner, or the like. The input devices may have any sort of display device, for instance, a monitor, a handheld display, an LCD display, a TFT display, or other display for presenting information to an end-user 121. In addition to a monitor, the input devices may also include other peripheral output devices, such as speakers, and printers that may be internal or external.

Although many other internal components of server 110 and the other input devices 115, 116, 118, and 120 are not shown, those of ordinary skill in the art will appreciate that such components and their interconnections are well known. Accordingly, additional details concerning the internal construction of the devices need not be disclosed in connection with embodiments of the invention.

Figure 2:
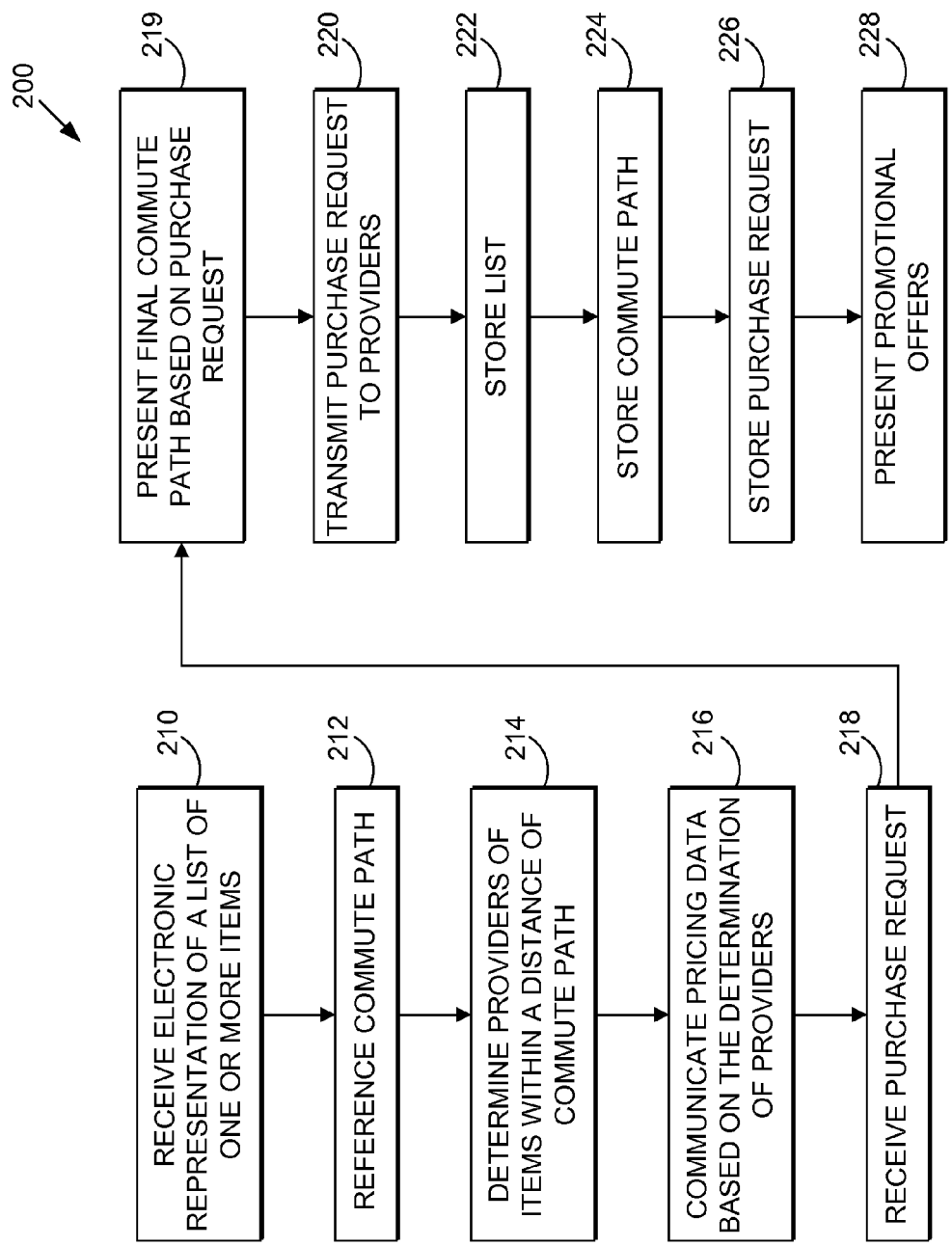
FIG. 2 is a flowchart illustrating an exemplary method for practicing an embodiment of the invention.

Turning now to FIG. 2, an exemplary process for practicing an embodiment of the invention is referenced generally by the numeral 200. The exemplary process 200 is merely one illustration of providing retail item pricing data. The steps illustrated in FIG. 2 are not to be construed as temporally dependent on the order shown. Those skilled in the art will appreciate that the various steps of process 200 can be carried out in an order different from that shown.

At a step 210, an electronic representation of a list of items 130 to inquire about is received. In one embodiment the list 130 is received by server 110. The electronic representation can be in the form of analog as well as digital information, including pulses of light such as those used in fiber-optic transmissions. List 130 includes items for which end-user 121 wishes to receive purchasing information. End-user 121 may wish to receive information on a loaf of bread, a case of soda, a computer mouse, and a basketball. As will be explained in greater detail, embodiments of the invention will allow end-user 121 to receive the composed list of items, and transmit pricing and availability information cross-referenced against commute data 134, such as a commute path. End-user 121 can transmit list 130 in a variety of ways.

In some embodiments, list 130 is received directly or indirectly through various client devices via network 111. For example, a kiosk 115 could be used to compose and transmit list 130. End-user 121 could use handheld device 116 or client-computer 120 to enter or select a list 130 of items to price. In some embodiments, end-user 121 is presented with options to make selections of items to price. In other embodiments, end-user 121 can input items to purchase. Other client devices, besides those shown on FIG. 1, could be used to transmit a list 130 of desired items. For example, an automobile two-way communication device or other consumer electronic device could be used to request purchasing data.

At a step 212, commute data 132 is referenced. A commute path is one type of commute data. The commute path referenced could have been recalled from a memory. Because commute paths are typically recurring, they can be stored for easy recall. Providing a commute path enables server 110 to provide commute-specific purchasing options to end-user 121. In one embodiment, the commute path is defined by a first location and a second location and can be part of location information 134. The two locations can be provided and set by end-user 121. In this embodiment of the invention, end-user 121 fixes a starting point and an ending point and the embodiment of the invention provides purchasing data by referencing the commute path. For example, end-user 121 could provide a work address and a home address. Having provided a beginning point and a destination, mapping component 122 could generate a commute path. The embodiment of the invention would then use this commute path to identify providers of goods that end-user 121 wishes to purchase.

In another embodiment, the commute path is not fixed, but is determined based on the location of the businesses or providers. In this embodiment, end-user 121 is interested in the most time-efficient manner of procuring the most items on list 130. Mapping component 122 could determine a commute path based on the two addresses. Different businesses or providers 124 may provide the desired products. End-user 121 receives an efficient route to purchase the items on list 130.

Alternative means for providing location information 134 are available besides manual entry. Location-sensing devices could be used to automatically provide location information 134. Information could be submitted directly to server 110 by handheld device 116. The physical location of certain handheld devices 116 can be determined based on their use within a communications network, which could be network 111. In those situations where the location of handheld device 116 can be determined, location information 134 can be received by server 110 automatically. Similarly, GPS device 118 could be used to automatically provide location information 134.

With the location information received, an embodiment of the invention identifies business entities 124 that can provide items on list 130 at a step 214. Different businesses 124 can be affiliated with embodiments of the invention to provide a pool of product providers. Embodiments of the invention are not limited to providing feedback of only similar items or of items that can be purchased from a single location. Rather, purchasing data of disparate items from a variety of businesses can be provided to end-user 121.

Providers 124 can be identified in a variety of ways. In one embodiment, providers 124 are identified by referencing item-pricing data and/or item-availability data. Each provider 124 has an associated database 126, which stores various data related to the products it provides. Business database 126 can automatically capture customer purchases. In some embodiments, server 110 accesses database 126 to return the result of a query submitted by end-user 121. In other embodiments, database 112 is periodically updated and information is provided to end-user 121. This allows end-user 121 to have a nonstore-specific account whereby his/her purchasing patterns from various vendors 124 can be retrieved and/or stored in database 112. Providers are also identified based on being a certain distance from the location information 134 referenced. The distance information could be a parameter set by end-user 121 or a default distance, such as fifty miles.

At a step 216, the pricing data is communicated to end-user 121 based on the determination of the providers 124. Pricing data can include, but is not limited to, prices of at least a portion of the items offered provider 124; availability status of items; product descriptions; and/or a complete or partial sum of the prices of the items requested. Based on the aforementioned example, a request for purchasing-information on a loaf of bread, a case of soda, a computer mouse, and a basketball could return a list of available providers, an optimized commute path, and a sum total for the products requested. If a customer requests information on items commonly available from a single provider, such as grocery items, an embodiment of the invention could return a list of available providers and a sum total associated with each provider. An embodiment of the invention could also provide a list of providers that have the different items for sale, simplifying the shopping experience of end-user 121. The purchasing information can be presented on the client device used to submit the query. Discount information, promotions, upsales, generic alternatives, etc., could also be presented on the client device.

After requesting purchasing data, end-user 121 may wish to submit a request to purchase 135 the items queried. Thus, a purchase request 135 can be received at a step 218. Upon receiving the purchase request 135, end-user 121 can optionally be presented with a final commute path at a step 219 that takes into account the providers selected via purchase request 130. For example, an end-user 121 may provide a starting and ending point and no providers are situated along the commute path generated in step 212. Depending on the distance parameter set in step 214, providers may not exist within a prescribed distance of the commute path. If end-user 121 opts to purchase items from a provider that was not directly situated within the commute path, then a final commute path could be provided to end-user 121 at step 219 that presents an efficient route from the provided starting point, to the provider(s), and then to the destination point.

The purchase request 135 can then be transmitted to the provider 124 at step 220. This allows the end-user 121 to be able to simply pick-up a completed order, further enhancing the shopping experience of end-user 121. For example, end-user 121 could seek prices of coffee on his/her way to work, select a convenient location with a competitive price, place the order and pick it up without having to wait in line. Payment information can also be provided by end-user 121 to automatically pay for the item(s) requested.

In some embodiments of the invention, the list 130 of items can be stored in database 112 at a step 222. Commute paths and purchase requests 135 can also be stored at respective steps 224 and 226. Logging such historical data allows trends and pricing patterns to be observed as well as reports 128 to be made. With such data, general or specific promotional offers can be provided to customers at step 228. Buying habits can be analyzed to provide end-user 121 specific advertisements and notifications.

As can be seen, embodiments of the present invention and any equivalent are well adapted to provide purchasing data to remote users. Many different arrangements of the various components depicted, as well as components not shown, are possible without departing from the spirit and scope of embodiments of the present invention.

Embodiments of the invention have been described which are intended in all respects to be illustrative rather than restrictive. Alternative embodiments will become apparent to readers of this disclosure after and because of reading it. Alternative means of implementing the aforementioned can be completed without departing from the scope of the claims below It will be understood that certain features and subcombinations are of utility and may be employed without reference to other features and subcombinations and are contemplated within the scope of the claims. Not all steps listed in the various figures need be carried out in the specific order described.

What the invention claimed is:

1. A method for accepting a request for retail product information from an end-user, comprising:
   presenting a first prompt on a client device for communicating a request for information regarding one or more items;
   presenting a second prompt for communicating a commute route; and
   presenting purchasing data related to said one or more items to said end-user, wherein said purchasing data includes prices of said one or more items offered by one or more providers within a distance from said commute route.

2. The method of claim 1, wherein said client device includes a selection from the group comprising: a handheld device, a computer, a kiosk, an automobile two-way communication device, a telephone and a database.

3. The method of claim 2, wherein said handheld device includes a selection from the group comprising: a mobile phone, a pager, a personal data assistant (PDA), and personal information manager (PIM).

4. The method of claim 3, wherein said commute route is generated from input provided by said end-user.

5. The method of claim 3, wherein said commute route is generated from input provided by a location-sensing device.

6. The method of claim 5, wherein said location-sensing device includes a device equipped with a global-positioning component.

7. The method of claim 3, wherein said commute route includes data received from a mapping component.

8. The method of claim 4, wherein said distance is at most fifty miles.

9. The method of claim 8, wherein said distance is a parameter received from said end-user.

10. The method of claim 8, wherein said distance is a default value.

11. The method of claim 8 wherein said purchasing data includes a selection from the group comprising:
   a price of said one or more items offered by said one or more providers;
   an availability status of said one or more items offered by said one or more providers;
   an availability status of alternative products related to said items;
   an availability status of complementary products related to said items;
   an availability status of generic alternatives to said items;
   a product description; and
   a sum of said prices.

12. The method of claim 11, wherein presenting said purchasing data includes presenting said purchasing data on said client device.

13. The method of claim 12, further comprising:
   presenting a third prompt for receiving a purchase request from said end-user to order said one or more items from said one or more providers; and
   presenting a confirmation prompt that said purchase request was transmitted to said one or more providers.

14. The method of claim 13, further comprising presenting a final commute path, wherein said final commute path includes said provider(s) to fulfill said purchase request.

15. The method of claim 13, further comprising presenting a promotional offer from said one or more providers.

16. Computer-storage media having computer-useable instructions embodied thereon for implementing a system for accepting a request for retail product information from an end-user, comprising:
   a list-processing component that presents a first prompt on a client device for communicating a request for information regarding one or more items;
   a route-processing component that presents a second prompt for communicating a commute route; and
   a purchasing-data component that presents purchasing data related to said one or more items to said end-user, wherein said purchasing data includes prices of said one or more items offered by one or more providers within a distance from said commute route.

17. Computer-storage media having computer-useable instructions embodied thereon for a method of providing retail product information on a list of one or more items, the method comprising the steps of:
   providing for the creation of an end-user account;
   associating a first retail sale of one or more items from a first business with said end-user account; and
   associating a second retail sale of one or more items from a second business with said end-user account.

18. The computer-readable medium of claim 17, wherein said first retail sale comprises items to be received by said end-user from said first business.

19. The computer-readable medium of claim 18, wherein said second retail sale comprises items to be received by said end-user from said second business.

20. The computer-readable medium of claim 19, further comprising:
   storing said retail sales;
   associating payment information of said end-user with said end-user account;
   presenting one or more of said stored retail sales to said end-user;
   managing said stored retail sales, wherein said managing includes a selection from a group comprising:
   (1) sharing said stored retail sales with other retailers,
   (2) reviewing a history of said stored retail sales,
   (3) organizing said stored retail sales, and
   (4) communicating said stored retail sales to a remote device.

* * * * *